(12) United States Patent
Heydenrych et al.

(10) Patent No.: US 9,580,657 B2
(45) Date of Patent: Feb. 28, 2017

(54) FLUIDISED BED PYROLYSIS APPARATUS AND METHOD

(75) Inventors: Michael David Heydenrych, Lyttleton Manor (ZA); Stephen David Swart, Newcastle (ZA); Akwasi Acheampong Boateng, Royersford, PA (US)

(73) Assignees: University of Pretoria, Hatfield Pretoria (ZA); The United States, as represented by the Secretary of Agriculture, Washington, DC (US)

( * ) Notice: Subject to any disclaimer, the term of this patent is extended or adjusted under 35 U.S.C. 154(b) by 874 days.

(21) Appl. No.: 13/820,721

(22) PCT Filed: Sep. 8, 2011

(86) PCT No.: PCT/ZA2011/000067
§ 371 (c)(1),
(2), (4) Date: Sep. 25, 2013

(87) PCT Pub. No.: WO2012/034141
PCT Pub. Date: Mar. 15, 2012

(65) Prior Publication Data
US 2014/0008205 A1    Jan. 9, 2014

Related U.S. Application Data

(60) Provisional application No. 61/381,917, filed on Sep. 10, 2010.

(51) Int. Cl.
*C10B 49/22* (2006.01)
*C10B 53/02* (2006.01)
(Continued)

(52) U.S. Cl.
CPC ............. *C10B 49/22* (2013.01); *C10B 53/02* (2013.01); *C10K 1/16* (2013.01); *F23C 10/005* (2013.01);
(Continued)

(58) Field of Classification Search
CPC .. C10B 49/22; C10B 53/02; B01J 8/26; F23C 10/005; F23C 10/01; F23C 10/20; F23C 10/24; C10K 1/16
(Continued)

(56) References Cited

U.S. PATENT DOCUMENTS 3,921,590 A * 11/1975 Mitchell ................. F23C 10/06
110/245
4,279,207 A * 7/1981 Wormser ............ F22B 31/0007
110/345

(Continued)

FOREIGN PATENT DOCUMENTS

DE    195 17 096 A1    11/1996
WO    WO 94/24228 A1    10/1994

OTHER PUBLICATIONS

Aho et al., "Catalytic pyrolysis of woody biomass in a fluidized bed reactor: Influence of the zeolite structure", Fuel, IPC Science and Technology Press, Guildford, GB, vol. 87, No. 12, Sep. 1, 2008, pp. 249-2501.

*Primary Examiner* — Jill Warden
*Assistant Examiner* — Joye L Woodard
(74) *Attorney, Agent, or Firm* — Knobbe Martens Olson & Bear, LLP

(57) ABSTRACT

A carbonaceous feed pyrolysis apparatus is provided including two or more hot particle fluidized beds, and one or more positive displacement apparatus for the transfer of hot particles between two or more of the beds, wherein one or more of the fluidized beds contains a combustion zone. A bio-oil production process is also provided, including pyrolysis of a carbonaceous bio-mass using two or more fluidized beds, including a first combustion zone carried out in one or more combustion fluidized beds in which a particulate material is fluidized and heated, and a second pyrolysis zone carried out in one or more pyrolysis fluidized
(Continued)

beds in which the hot particles heated in the combustion zone are used for pyrolysis of the bio-mass.

18 Claims, 3 Drawing Sheets

(51) Int. Cl.
    *C10K 1/16*     (2006.01)
    *F23C 10/00*     (2006.01)
    *F23C 10/01*     (2006.01)
    *F23C 10/20*     (2006.01)
    *F23C 10/24*     (2006.01)

(52) U.S. Cl.
    CPC .............. *F23C 10/01* (2013.01); *F23C 10/20* (2013.01); *F23C 10/24* (2013.01); *Y02E 50/14* (2013.01); *Y02P 20/145* (2015.11)

(58) Field of Classification Search
    USPC .......................... 201/12, 31; 202/99; 422/141
    See application file for complete search history.

(56) References Cited

U.S. PATENT DOCUMENTS

| | | |
|---|---|---|
| 4,311,670 A | 1/1982 | Nieminen |
| 4,823,712 A | 4/1989 | Wormer |
| 2012/0203042 A1* | 8/2012 | Huber ..................... C10B 49/22 585/242 |

\* cited by examiner

FLUIDISED BED PYROLYSIS APPARATUS AND METHOD

INCORPORATION BY REFERENCE TO RELATED APPLICATIONS

Any and all priority claims identified in the Application Data Sheet, or any correction thereto, are hereby incorporated by reference under 37 CFR 1.57. This application is the national phase under 35 U.S.C. §371 of prior PCT International Application No. PCT/ZA2011/000067 which has an International filing date of Sep. 8, 2011, which designates the United States of America, and which claims the benefit of U.S. Provisional Patent Application No. 61/381,917 filed Sep. 10, 2010, the disclosures of which are hereby expressly incorporated by reference in their entirety and are hereby expressly made a portion of this application.

FIELD OF THE INVENTION

The invention relates to the pyrolysis of carbonaceous material, such as bio-mass, in a fluidised bed pyrolysis apparatus.

BACKGROUND TO THE INVENTION

Fast pyrolysis of bio-mass involves rapidly heating solid bio-mass to a temperature of 400° C. to 600° C. in reducing conditions so that it forms an oil. This is typically done in a fluidized bed, where approximately 60% of the original biomass can be recovered as oil. The pyrolysis is endothermic in nature, and the energy required is typically obtained by heating the fluidized bed indirectly, using electrical heating elements.

The source of heat for heating the fluidised bed is sand which is heated using electrical heating elements to provide the energy for the endothermic reaction. Electrical energy is continuously required in order to maintain the pyrolysis reaction.

In order to reduce the electrical energy demand, char produced by the pyrolysis of the bio-mass is recycled as a fuel to the pyrolysis reaction where it is combusted to provide some of the energy required to maintain the pyrolysis temperature, however, this is done at the expense of the char being lost.

The inventors have thus identified a need for a more efficient pyrolysis apparatus for the pyrolysis of bio-mass while reducing the need for an external energy source and possibly allowing for some or all of the char thus produced to be retained for alternative use rather than as a fuel to the pyrolysis.

SUMMARY OF THE INVENTION

According to a first aspect of the invention, there is provided a carbonaceous feed pyrolysis apparatus including two or more hot particle fluidised beds, and one or more positive displacement apparatus for the transfer of hot particles between two or more of the beds.

One or more of the fluidised beds may contain a combustion zone.

One or more of the fluidised beds may contain a pyrolysis zone.

The positive displacement apparatus may be a screw feeder or the like.

The screw feeder may be driven by a variable speed drive motor or a constant speed drive motor.

The hot particles in the fluidised beds may be sand particles.

The hot particles in the fluidised beds may be primarily catalyst particles.

The catalyst particles may be zeolite particles.

The catalyst particles are typically cracking catalyst particles such as acidic zeolite particles.

The apparatus may include one or more "L" valves between the combustion and pyrolysis zones so that hot particles may flow from the combustion zone or zones to the pyrolysis zone or zones while impeding the flow of gas in the opposite direction.

The apparatus as described above, including a recycle duct for gas produced in the pyrolysis zone to the combustion zone for combustion for the heating of the hot particles.

The combustion fluidised bed may include fluidised bed nozzles whereby the fluidising gas, as well as or any combustion gasses, are injected into the fluidised bed through one or more nozzles at a base portion of the fluidised bed.

The pyrolysis fluidised bed may have a similar nozzle arrangement for the fluidising gas.

In both cases the nozzle arrangement is selected rather than the standard plenum arrangement permitting removal of the hot particles from the base of the fluidised beds by the positive displacement apparatus with a smaller hold up volume as the hot particles can drop past the nozzles for extraction.

Air may enter downwards or upwards through the nozzles into the fluidised beds. Horizontal jets may prevent sand from flowing into an air supply line. The recycle gas duct or line may enter as close as possible to the nozzle, where it mixes with cold air, and combusts in the fluidised bed.

The apparatus may include a char separator after the pyrolysis fluidised bed whereby char can be captured. Typically the captured char may be recycled to the combustion fluidised bed or be used for other purposes unrelated to the operation of the pyrolysis apparatus. The char separator may be a cyclone.

According to a second aspect of the invention, there is provided a bio-oil production process, said process including pyrolysis of a carbonaceous bio-mass, which process includes 2 or more fluidised beds, a first combustion zone carried out in one or more combustion fluidised beds in which a particulate material is fluidised and heated, and a second pyrolysis zone carried out in one or more pyrolysis fluidised beds in which the hot particles heated in the combustion zone are used for pyrolysis of the bio-mass, said combustion zone being operated at or about atmospheric pressure at a temperature of from 400° C. to 1100° C., typically around 900° C., and the pyrolysis zone being operated at a pressure of from atmospheric to 100 Barg at a temperature of from 400° C. to 900° C., typically 500° C. to 600° C.

Pyrolysis gas from the pyrolysis zone may be at least partially recycled to the combustion zone as a source of fuel for the combustion used to heat the particles.

The hot particles may be sand particles, or catalyst particles as described above.

The pyrolysis zone may be operated at or about atmospheric pressure.

The use of catalyst in the pyrolysis zone may allow more throughput of bio-mass because more $CO_2$ is produced and therefore the reaction will be less endothermic.

The catalyst is typically a cracking catalyst such as an acidic zeolite.

The area of the combustion fluidized bed may be 2-6 times larger than that of the pyrolysis bed, typically 3-4 time larger. This may be more energy-efficient because less of the enthalpy available from the hot particles is used to re-heat the recycled gases, and more enthalpy is used to drive the endothermic pyrolysis reaction.

The superficial gas velocity (SGV) may be high in the combustion fluidised bed at a rate of from 1 m/s to 4 m/s, typically 2 m/s, in order to burn as much oxygen as possible in a bed of a given area.

The superficial gas velocity of the recycle pyrolysis gas may be as low as possible while still achieving good fluidisation and thus mixing.

The SGV in the pyrolysis fluidised bed may be from 0.2 to 2 m/s, typically 0.5 m/s. It is believed that in this way less enthalpy is lost by means of heating the cold recycle gas. The bio-mass also enters as a solid, and leaves as a gas, thereby increasing the superficial gas velocity as the pyrolysis reaction occurs. The SGV of the recycled pyrolysis gas is controlled or selected in relation to the degree of entrainment of hot particles in the combustion zone and thus if high entrainment occurs at 2.5 m/s, for instance, a low SGV of recycle pyrolysis gas can be selected in order to allow larger throughput of biomass before SGV gets unacceptably high due to vapourization of biomass.

Air supply to the fluidized bed may be preheated by exchanging heat from the gases exiting the combustion zone. This may substantially reduce the fluidized bed area required in the combustion zone to heat a given mass flow rate of hot particles. It also may reduce the amount of carbon that is combusted to form $CO_2$, making the process more environmentally friendly.

The temperature of the combustion fluidized bed may be controlled by varying the rate of transfer of hot particles from the pyrolysis zone to the combustion zone, for example, by varying the speed of a motor driving the positive displacement apparatus such as a screw feeder used for the purpose.

The air flow rate is typically fixed to provide a constant SGV through the combustion zone. Fuel flow rate (recycle gas) may be adjusted in order to ensure that there is always sufficient excess oxygen in the gas exiting from the combustion chamber. This may be estimated by measuring $CO_2$ concentration in the exit gases and inferring excess oxygen.

The temperature in the pyrolysis zone is controlled by varying the rate of bio-mass entering the pyrolysis zone. The recycle gas flow rate is typically fixed in order to ensure adequate fluidization in the pyrolysis fluidised bed.

The fluidised beds may include disengagement zones. The pressure in the disengagement zones of both the pyrolysis and combustion fluidised beds may be close to atmospheric pressure because of the difficulty of adequate sealing at high temperatures. The pressure in the disengagement zone may be controlled by controlling the speed of an induced draft (ID) fan or by controlling a damper setting in a low pressure line.

The pressure in the pyrolysis zone may be controlled by varying the amount of purge gas released from the recycle gas stream.

Where catalyst particles are used instead of hot sand, the combustion zone also serves to regenerate the catalyst as it burns off any coke formed in the pores of the particles during pyrolysis.

BRIEF DESCRIPTION OF THE DRAWINGS

The invention will now be described, by way of non-limiting example only, with reference to the accompanying flow sheet and diagrammatic drawings, FIGS. 1 and 2.

DETAILED DESCRIPTION OF THE PREFERRED EMBODIMENT

Figure 1:
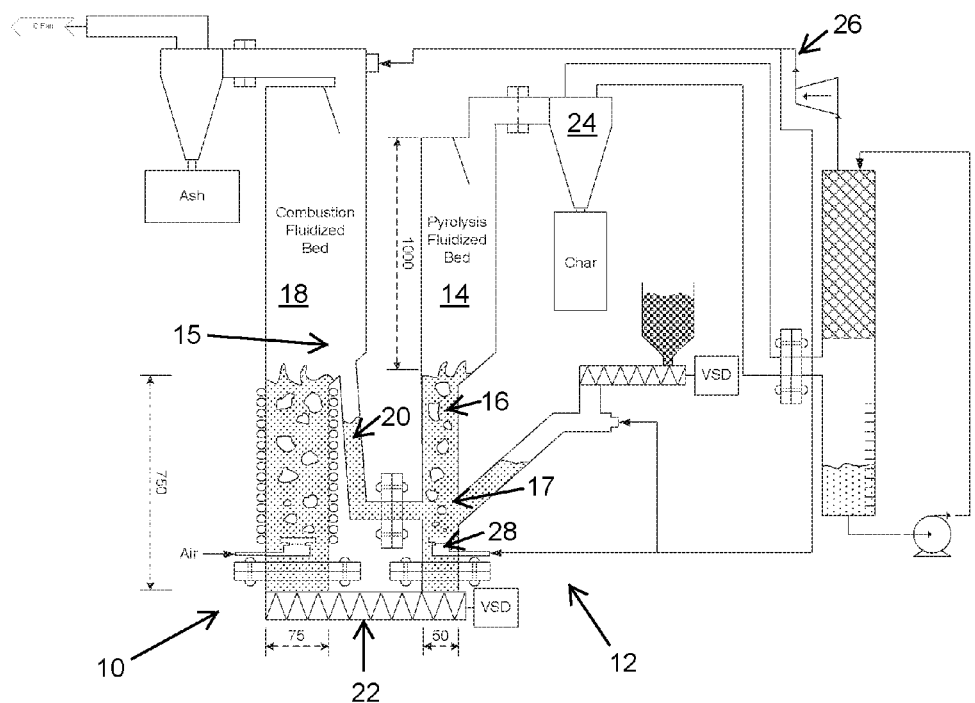
In FIG. 1 is shown a dual fluidised bed pyrolysis apparatus of the invention.

In the flow sheet 10 of FIG. 1, representing an embodiment of this invention, a pyrolysis apparatus 12 and a pyrolysis process is provided for rapidly heating bio-mass to be pyrolysed to bio-oil by mixing it in a pyrolysis fluidised bed 14 with hot particles, in the form of hot sand 16, from a separate fluidised bed operating in combustion conditions.

The combustion fluidised bed 18 has a cross sectional area 3 to 4 times that of the cross sectional area of the pyrolysis fluidised bed 14.

In FIG. 1, the combustion fluidised bed 18 is kept hot, typically around 900° C., by burning combustible gas and char. The hot sand 16 moves from the combustion region 15 to the pyrolysis region 17 by means of an "L" valve 20 which is known in fluidised bed technology.

The pyrolysis reaction cools the sand down to 500-600° C., and the cooled sand is returned by a screw conveyor 22 to the hot combustion fluidised bed 18 for re-heating.

Some char is entrained with the sand although most of the char will be entrained with the gas and will be collected by the cyclone 24. The char in the sand will burn in the fluidised bed, to provide at least part of the required energy. More energy can be provided from the purge of the pyrolysis gas loop 26. ⅔ of the energy required for combustion can come from the pyrolysis gases which are combustible gases. These gases are introduced directly into the fluidised bed nozzles 28 with the recycle pyrolysis gas being fed concentricly with the air supply pipe into the fluidised bed gas feed pipes to the fluidised bed nozzles. It is preferable to use the gas as the heat source thereby saving the char, because the char is a valuable resource for farmers; it improves the soil when it is worked in.

Figure 2:
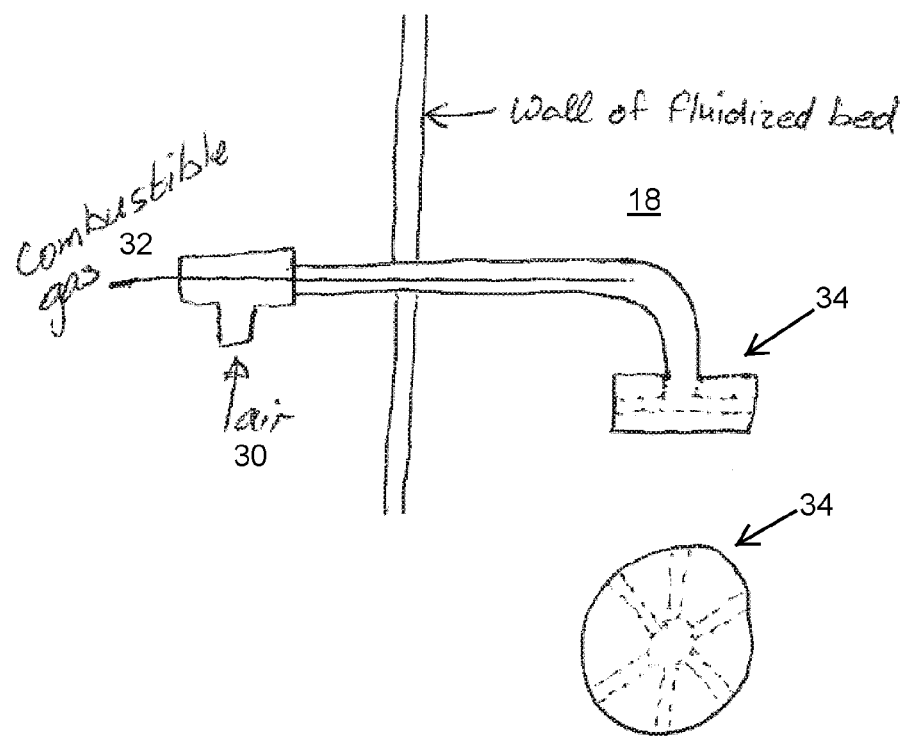
In FIG. 2 is shown a nozzle arrangement for the fluidised beds of FIG. 1; and In FIG. 3 is shown another embodiment of the pyrolysis apparatus of FIG. 1.

As shown in FIG. 2, the air 30 may enter the fluidised bed 18 through the nozzles either downwards, as indicated, or upwards. The horizontal jets are designed to prevent sand from flowing into the air supply line. The gas line 32 enters as close as possible to the nozzle 34 (28), where it mixes with cold air, and combusts in the fluidized bed.

In another embodiment represented by the same flowsheet of FIG. 1, the sand 16 that is used for the bed of the fluidised beds 14, 18 of the first embodiment is replaced with catalyst that provides a more stable bio-oil than using sand alone. The oxygen content in the oil can be reduced in this way (being removed as $CO_2$. Without this treatment, the oils are reactive and oligomerize over time to become an unmanageable sludge. The catalytically treated oil can be blended into refinery feedstocks to form transportation fuel.

At pyrolytic temperatures, catalysts are prone to coking, which deactivates them. They will last just 5 minutes at these conditions. The catalyst can be renewed by burning off the carbon. The dual fluidised bed system of the invention provides the ideal circumstances for continuous regeneration of the pyrolysis catalyst as the catalyst particles which are returned by the screw feeder to the combustion fluidised bed are heated to around 900° C. which regenerates the catalyst continuously.

Figure 3:
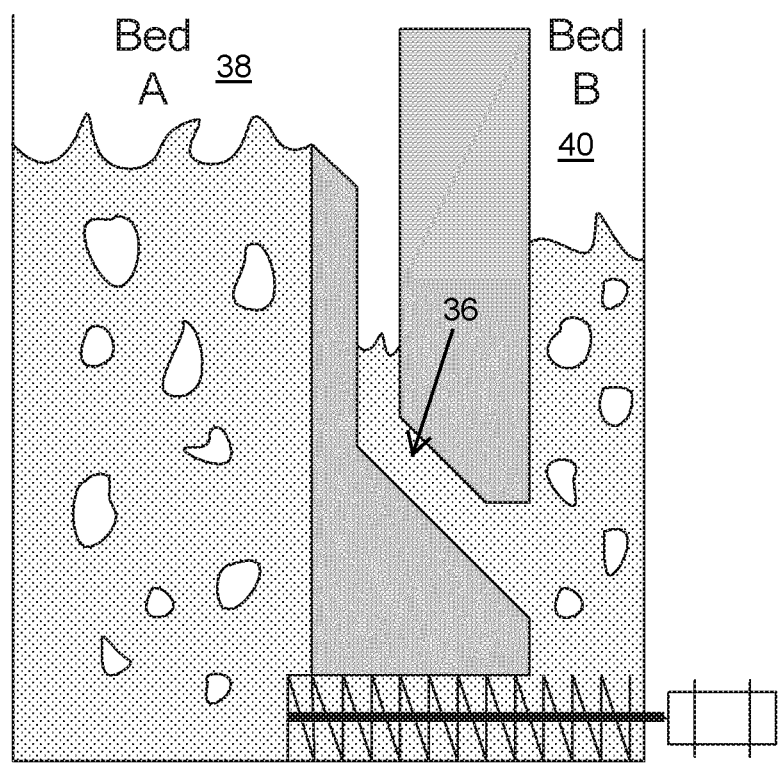

In FIG. 3, the flowsheet of FIG. 1 is modified in that the hot sand moves from the combustion region to the pyrolysis region by means of a "Z" valve which is novel in fluidised bed technology.

Unlike L-valves 20 of FIG. 1, in which the bottom pipe section is at 90° from the vertical, the non-mechanical "Z" valve 36 design makes use of an angle between 120° and 150°, e.g., closer to 135°, as shown between Bed A 38 (equivalent to 18 in FIG. 1) and Bed B 40 (equivalent to 14 in FIG. 1) in FIG. 3. This allows for the unassisted transport of solids through the valve as only gravity is required as the driving force for the flow of solids.

It is believed to be an advantage of the invention that more efficient pyrolisis is achieved as well as better quality bio-oil, while char which is produced can be used for other purposes.

The invention claimed is:

1. A carbonaceous feed pyrolysis apparatus, comprising:
a combustion reactor configured to contain a first fluidized bed of hot particles, the first fluidized bed containing a combustion zone;
a pyrolysis reactor configured to contain a second fluidized bed of hot particles, the second fluidized bed containing a pyrolysis zone;
one or more positive displacement apparatus configured for transfer of hot particles from a base portion of the pyrolysis reactor to a base portion of the combustion reactor; and
one or more non-mechanical "Z" valves having an angle of between 120° and 150° and situated between the combustion reactor and the pyrolysis reactor, wherein the one or more non-mechanical "Z" valves are configured such that, in operation, hot particles flow from the combustion zone at a temperature of from 400° C. to 1100° C. to the pyrolysis zone while impeding a flow of gas in an opposite direction.

2. The carbonaceous feed pyrolysis apparatus of claim 1, further comprising hot particles, wherein the hot particles are sand particles.

3. The carbonaceous feed pyrolysis apparatus of claim 2, further comprising:
first fluidized bed nozzles at the base portion of the combustion reactor, wherein the first fluidized bed nozzles are configured to inject a fluidizing gas and/or a combustion gas into the combustion reactor; and
second fluidized bed nozzles at the base portion of the pyrolysis reactor, wherein the second fluidized bed nozzles are configured to inject a fluidizing gas and/or a pyrolysis gas into the pyrolysis reactor.

4. The carbonaceous feed pyrolysis apparatus of claim 3, wherein the second fluidized bed nozzles are configured to permit removal of the hot particles from the base portion of the pyrolysis reactor by the one or more positive displacement apparatus, wherein, in operation, the one or more positive displacement apparatus are configured to exhibit a smaller hold up volume as the hot particles drop past the second fluidized bed nozzles for removal.

5. The carbonaceous feed pyrolysis apparatus of claim 1, further comprising hot particles, wherein the hot particles are primarily catalyst particles.

6. The carbonaceous feed pyrolysis apparatus of claim 5, wherein the catalyst particles are cracking catalyst particles.

7. The carbonaceous feed pyrolysis apparatus of claim 1, further comprising a char separator in fluid communication with pyrolysis reactor and configured to capture char.

8. The carbonaceous feed pyrolysis apparatus of claim 1, wherein the one or more positive displacement apparatus comprise a screw feeder driven by a variable speed drive motor or a constant speed drive motor.

9. A bio-oil production process, comprising:
providing the apparatus of claim 1;
fluidizing and heating a first portion of hot particles in the combustion reactor to form the first fluidized bed comprising the combustion zone, wherein the combustion zone is operated at or about atmospheric pressure and at a temperature of from 400° C. to 1100° C.;
transferring hot particles, via the one or more non-mechanical "Z" valves, from the combustion reactor to the pyrolysis reactor to form the second fluidized bed containing the pyrolysis zone, wherein the pyrolysis zone is operated at a pressure of from atmospheric pressure to 100 Barg and at a temperature of from 400° C. to 900° C.;
introducing a carbonaceous bio-mass into the pyrolysis zone, whereby a bio-oil is obtained by pyrolysis of the carbonaceous bio-mass; and
at least partially recycling a pyrolysis gas from the pyrolysis zone to the combustion zone as a source of fuel for heating the hot particles.

10. The bio-oil production process of claim 9, wherein the pyrolysis zone is operated at a temperature of from 500° C. to 600° C.

11. The bio-oil production process of claim 9, wherein the hot particles are catalyst particles, and wherein the catalyst particles in the pyrolysis zone increase throughput of the carbonaceous bio-mass via production of more $CO_2$, which renders the pyrolysis reaction less endothermic.

12. The bio-oil production process of claim 11, wherein the catalyst particles are cracking catalyst particles.

13. The bio-oil production process of claim 12, wherein the catalyst particles are acid zeolite catalyst particles.

14. The bio-oil production process of claim 9, wherein the pyrolysis zone is operated at or about atmospheric pressure.

15. The bio-oil production process of claim 9, further comprising controlling or selecting a superficial gas velocity of the recycled pyrolysis gas in relation to a degree of entrainment of hot particles in the combustion zone.

16. The bio-oil production process of claim 9, further comprising controlling the temperature of the combustion zone by varying a rate of transfer of hot particles from the pyrolysis zone to the combustion zone by the positive displacement apparatus.

17. The bio-oil production process of claim 9, wherein the first fluidized bed and the second fluidized bed each comprise a disengagement zone, and wherein a pressure in each of the disengagement zones is close to atmospheric pressure.

18. The bio-oil production process of claim 9, wherein the hot particles are catalyst particles, the method further comprising regenerating, in the combustion zone, the catalyst particles by burning off coke formed in pores of the catalyst particles during pyrolysis.

\* \* \* \* \*

UNITED STATES PATENT AND TRADEMARK OFFICE
CERTIFICATE OF CORRECTION

| | | |
|---|---|---|
| PATENT NO. | : 9,580,657 B2 | Page 1 of 1 |
| APPLICATION NO. | : 13/820721 | |
| DATED | : February 28, 2017 | |
| INVENTOR(S) | : Michael David Heydenrych | |

It is certified that error appears in the above-identified patent and that said Letters Patent is hereby corrected as shown below:

On the Title Page

At Lines 2-12 and page 2 at Lines 1-2 (item (57), Abstract), Change "A carbonaceous feed pyrolysis apparatus is provided including two or more hot particle fluidized beds, and one or more positive displacement apparatus for the transfer of hot particles between two or more of the beds, wherein one or more of the fluidized beds contains a combustion zone. A bio-oil production process is also provided, including pyrolysis of a carbonaceous bio-mass using two or more fluidized beds, including a first combustion zone carried out in one or more combustion fluidized beds in which a particulate material is fluidized and heated, and a second pyrolysis zone carried out in one or more pyrolysis fluidized beds in which the hot particles heated in the combustion zone are used for pyrolysis of the bio-mass." to --The invention provides a carbonaceous feed pyrolysis apparatus including a combustion reactor containing a fluidized bed of hot particles defining a combustion zone, a pyrolysis reactor containing a fluidized bed of hot particles defining a pyrolysis zone, one or more positive displacement apparatus for transferring hot particles from a base portion of the pyrolysis reactor to a base portion of the combustion reactor and one more non-mechanical "Z" valves having an angle of between 120° and 150° situated between the combustion reactor and the pyrolysis reactor such that hot particles flow from the combustion zone to the pyrolysis zone. A pyrolysis process for the production of bio-oil from a carbonaceous biomass within the pyrolysis zone includes operating the combustion zone at or about atmospheric pressure at a temperature of from 400° C. to 1100° C. and the pyrolysis zone at a pressure of from atmospheric to 100 Barg at a temperature of from 400° C. to 900° C.--.

In the Drawings

Sheet 1 of 3 (Figure 1) at Line 1, Change "D Fan" to --ID Fan--.

In the Claims

In Column 5 at Line 52, In Claim 4, before "hot" delete "the".

Signed and Sealed this
Twenty-seventh Day of March, 2018

Andrei Iancu
*Director of the United States Patent and Trademark Office*